United States Patent
Chin-Chung et al.

(10) Patent No.: US 11,842,003 B1
(45) Date of Patent: Dec. 12, 2023

(54) INTEGRATED FORCE SENSING METHOD FOR HAPTIC FUNCTION

(71) Applicant: DELL PRODUCTS L.P., Round Rock, TX (US)

(72) Inventors: Wu Chin-Chung, Yonghe Dist (TW); Yong-Teng Lin, Yilan (TW); Chun-Kai Tzeng, KeeLung (TW); Bradford Edward Vier, Taipei (TW)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/969,589

(22) Filed: Oct. 19, 2022

(51) Int. Cl.
*G06F 3/041* (2006.01)
*G01L 1/12* (2006.01)
*G06F 3/046* (2006.01)
*G06F 3/01* (2006.01)

(52) U.S. Cl.
CPC .......... *G06F 3/04142* (2019.05); *G01L 1/122* (2013.01); *G06F 3/016* (2013.01); *G06F 3/046* (2013.01); *G06F 2203/04105* (2013.01)

(58) Field of Classification Search
CPC ...... G06F 3/04142; G06F 3/016; G06F 3/046; G06F 2203/04105; G01L 1/122
See application file for complete search history.

(56) References Cited

U.S. PATENT DOCUMENTS

| | | | |
|---|---|---|---|
| 5,339,699 A | 8/1994 | Carignan | |
| 9,218,073 B1 | 12/2015 | Kremin et al. | |
| 10,698,489 B1 * | 6/2020 | Beyhs | G06F 3/016 |
| 2007/0222343 A1 * | 9/2007 | Kang | H01H 25/041 |
| | | | 341/15 |
| 2019/0086277 A1 * | 3/2019 | Chen | G06F 3/016 |

\* cited by examiner

*Primary Examiner* — Temesghen Ghebretinsae
*Assistant Examiner* — Ivelisse Martinez Quiles
(74) *Attorney, Agent, or Firm* — Larson Newman, LLP

(57) ABSTRACT

A touch panel device includes a face plate, a bracket, and a PCB. The face plate receives a contact. The bracket includes a permanent magnet affixed to a surface of the bracket. The PCB is positioned proximate to the bracket such that a surface of the PCB is adjacent to the bracket. The PCB includes a Hall sensor collocated proximate to the permanent magnet. The touch panel circuit is coupled to the Hall sensor. When the contact is received at the face plate, the PCB moves closer to the bracket. In response, the touch panel circuit receives a voltage from the Hall sensor, determines a force associated with the contact based upon the voltage, and triggers a haptic feedback response in the bracket.

20 Claims, 3 Drawing Sheets

INTEGRATED FORCE SENSING METHOD FOR HAPTIC FUNCTION

FIELD OF THE DISCLOSURE

This disclosure generally relates to information handling systems, and more particularly relates to providing integrated force sensing for a haptic function of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A touch panel device may include a face plate, a bracket, and a PCB. The face plate receives at a first surface a contact with the face plate. The PCB may be affixed by a first surface of the PCB to a second surface of the face plate and may include a permanent magnet affixed to a second surface of the PCB. The bracket may be positioned proximate to the PCB such that a first surface of the bracket is adjacent to the second surface of the PCB. The PCB may include a Hall sensor on the second surface of the PCB and collocated proximate to the permanent magnet. The touch panel circuit may be coupled to the Hall sensor. When a first contact is received at the first surface of the face plate, the PCB may move closer to the bracket. In response, the touch panel circuit may receive a voltage from the Hall sensor, determine a force associated with the contact based upon the voltage, and trigger a first haptic feedback response in the bracket.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1A:
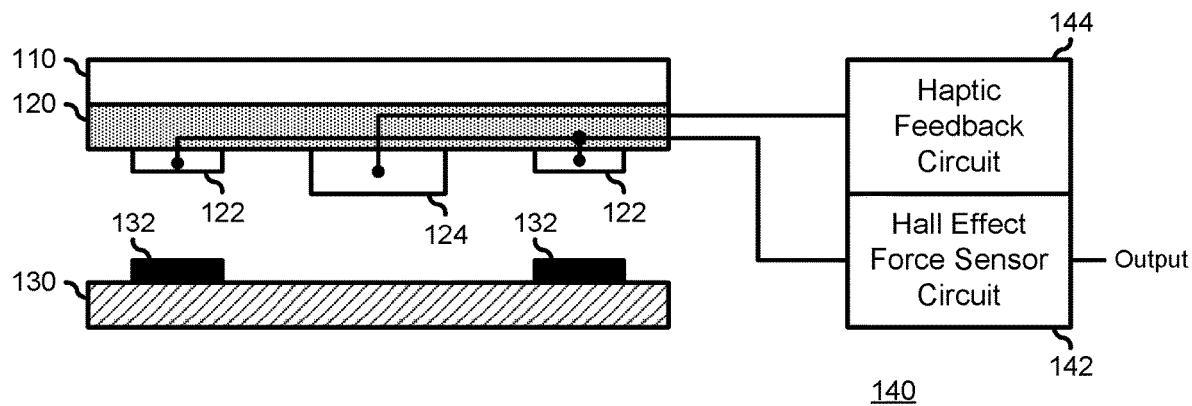
FIG. 1A is a block diagram of a side of a touch panel device according to an embodiment of the current disclosure.

FIG. 1A illustrates a touch panel device 100 configured to detect the force of a contact with the touch panel device and to give a haptic feedback in response to the contact. Touch panel device 100 includes a touch panel face plate 110, a touch panel printed circuit board (PCB) 120, a bracket 130, and a touch panel circuit 140. Touch panel device 100 provides for the detection of the contact with face plate 110, such as by a finger, a stylus, or another mechanical actuator configured to provide a localized force on the surface of the face plate. Moreover, touch panel device 100 is configured to measure the amount of force provided in the contact with face plate 110, and to give a haptic feedback to the contact. Touch panel device 100 may represent a stand-alone push button device, such as a power button for an information handling system, may represent a part of a larger device with one or more additional pushbutton assemblies, such as a key pad, may represent an integrated touch panel device with one or more pushbutton assemblies at particular locations for providing specific functions, such as where a cellular or tablet device includes a touch panel with a designated "home" button, or the like.

Figure 1B:
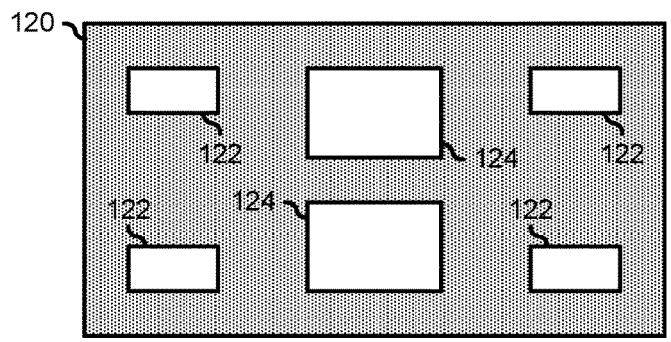
FIG. 1B is a block diagram of a bottom of a PCB of the touch panel device of FIG. 1A.
Figure 1C:
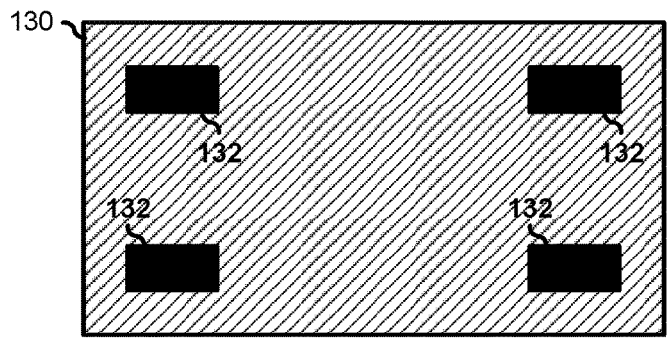
FIG. 1C is a block diagram of a top of a bracket of the touch panel device of FIG. 1A.

FIG. 1B illustrates a bottom view of touch panel PCB 120 that includes four (4) Hall sensors 122 and two coils 124. FIG. 1C illustrates a top view of PCB 130 that includes four (4) permanent magnets 132, each permanent magnet being located directly beneath an associated one of Hall sensors 122. In a particular embodiment, face plate 110 represents a rigidly affixed but flexible surface that provides an elastic deformation in response to a force applied at the surface of the face plate. In another embodiment, face plate 110 represents a button cover, such as a keyboard cap, a discrete pushbutton cap, or the like that moves downward in response to a force applied at the surface of the face plate. In either embodiment, the deformation/movement of face plate 110 is transmitted to touch panel PCB 120 to move the touch panel PCB downward towards bracket 130. The movement of touch panel PCB 120 is detected by the touch panel PCB and transmitted to touch panel circuit 140, and the touch panel circuit initiates a feedback to vibrate bracket 130, as described further below. The vibration of bracket 130 is transmitted back to touch panel PCB 120 and to face plate 110 to provide haptic feedback to the initiator of the force applied to the face plate. Bracket 130 may be mounted within a support structure of, for example, an information handling system.

In detecting a force applied to the top surface of face plate 110, the movement of touch panel PCB 120 is also experienced by Hall sensors 122, moving the Hall sensors closer to the associated permanent magnets 132 of bracket 130. Touch panel circuit 140 includes a Hall effect force sensor circuit 142 and a haptic feedback circuit 144. Hall sensors 122 are connected to an input of Hall effect force sensor circuit 142. Hall effect force sensor circuit 142 detects a changing voltage in response to hall sensors 122 being moved closer to permanent magnets 132.

Figure 2A:
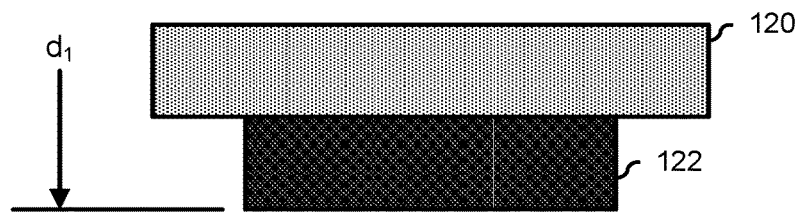
FIG. 2A illustrates a portion of the touch panel device of FIG. 1A with no force applied to a surface of the touch panel device.
Figure 2B:
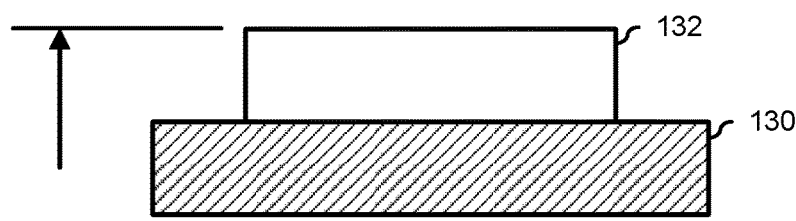
FIG. 2B illustrates a portion of the touch panel device of FIG. 1A with a force applied to a surface of the touch panel device.
Figure 2B:
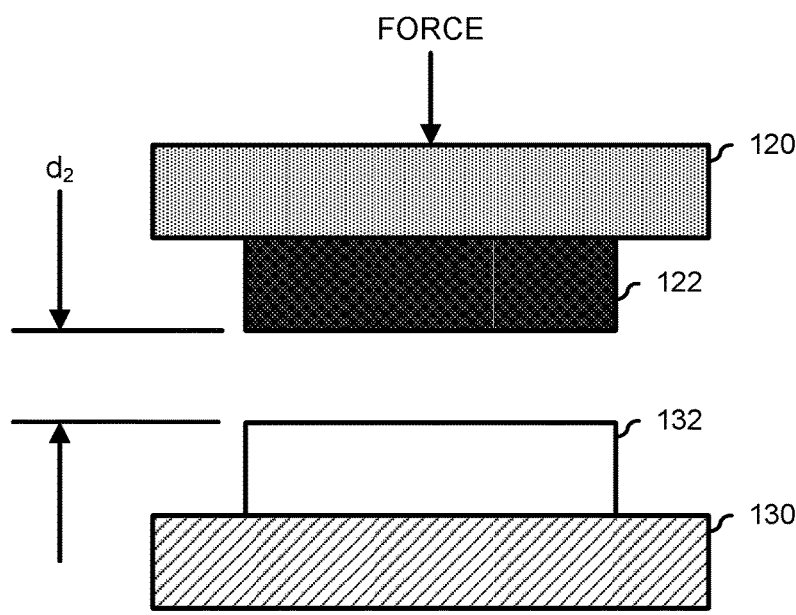

FIGS. 2A and 2B show a portion of touch panel device 100 that illustrates the operation of the force detection operation of the touch panel device. In FIG. 2A, no force is exerted on the top surface of face plate 110. In this relaxed state, Hall sensor 122 and permanent magnet 132 are separated by a known initial distance ($d_1$), and a known initial voltage is exhibited by the Hall sensor which is detected by Hall effect force sensor circuit 142. In FIG. 2B, a force is shown being exerted on the top surface of face plate 110. The force operates to move touch panel PCB 120 downward toward bracket 130 such that permanent Hall sensor 122 and permanent magnet 132 are a distance ($d_2$) apart that is less than the initial distance ($d_1$). This results in a different voltage being exhibited by Hall sensor 122. Hall effect force sensor circuit 142 operates to provide a force correlation table that correlates the distance between Hall sensor 122 and permanent magnet 132 with the associated voltage exhibited by the Hall sensor, and calculates a force associated with the detected voltage.

The force correlation table may represent distances in millimeters (mm), inches, or the like, and may represent forces in grams-force (gmF), kilograms-force (kgf), ounces-force (ozf), pounds-force (lbf), or the like, as needed or desired. The force correlation table is provided for illustrative purposes, and the values of a particular implementation of a touch panel device may likely result in different correlations between the distances, the resulting voltages, and the calculated forces. Hall effect force sensor circuit 140 includes an output configured to output an indication of the force detected by the Hall effect force sensor circuit, for example to an information handling system that includes touch panel device 100. The correlation of separation distances to voltage and to the force applied, and the design of circuits to provide a Hall effect force sensor circuit are known in the art and will not be further described herein, except as may be needed to illustrate the current embodiments.

Returning to FIG. 1, In providing a haptic feedback to the depression of face plate 110, touch panel PCB 120 acts as a mechanical oscillator to provide a vibration in response to detecting a force applied to the top surface of the face plate. Coils 124 may be understood to interact with additional permanent magnets (e.g., on bracket 130, not illustrated), such that a current in the coils results in a force being applied to the permanent magnets. In a particular embodiment, coils 124 interact with one or more of permanent magnets 132. Haptic feedback circuit 144 provides an oscillating signal on the output which causes coils 124 to induce an alternating force into the additional permanent magnet, setting up a vibration in touch panel PCB 120. In a particular embodiment haptic feedback circuit 144 provides the oscillating signal when Hall effect force sensor circuit 142 detects a force that exceeds a particular threshold. In another embodiment, haptic feedback circuit 144 provides varying levels of the oscillating signal in response to different force levels detected by Hall effect force sensor circuit 142. For example, a low level oscillating signal can be provided for a light force, a mid level oscillating signal can be provided for a heavier force, and a high level oscillating signal can be provided for a heavy force. In another embodiment, the oscillating signal increases linearly with increasing detected force levels. For example, the oscillating signal may be proportional to the detected force levels. The details of providing an oscillating signal by a haptic feedback circuit are known in the art and will not be further described herein, except as may be needed to illustrate the current embodiments.

Figure 3:
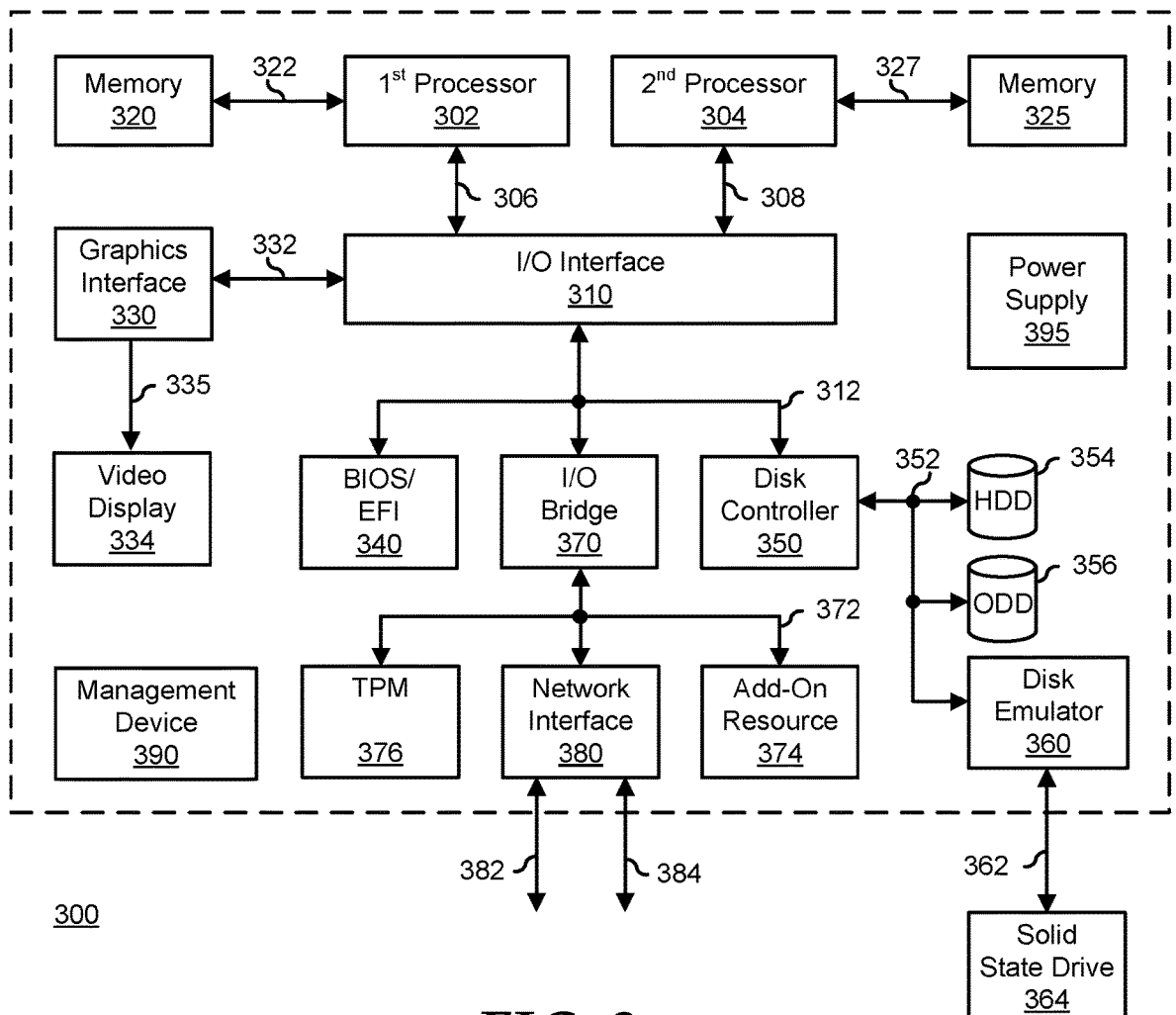
FIG. 3 is a block diagram illustrating a generalized information handling system according to another embodiment of the present disclosure.

FIG. 3 illustrates a generalized embodiment of an information handling system 300. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described below, and operates to perform one or more of the methods described below. Information handling system 300 includes processors 302 and 304, an input/output (I/O) interface 310, memories 320 and 325, a graphics interface 330, a basic input and output system/universal extensible firmware interface (BIOS/UEFI) module 340, a disk controller 350, a hard disk drive (HDD) 354, an optical disk drive (ODD) 356, a disk emulator 360 connected to an external solid state drive (SSD) 362, an I/O bridge 370, one or more add-on resources 374, a trusted platform module (TPM) 376, a network interface 380, a management device 390, and a power supply 395. Processors 302 and 304, I/O interface 310, memory 320 and 325, graphics interface 330, BIOS/UEFI module 340, disk controller 350, HDD 354, ODD 356, disk emulator 360, SSD 362, I/O bridge 370, add-on resources 374, TPM 376, and network interface 380 operate together to provide a host environment of information handling system 300 that operates to provide the data processing functionality of the information handling system. The host environment operates to execute machine-executable code, including platform BIOS/UEFI code, device firmware, operating system code, applications, programs, and the like, to perform the data processing tasks associated with information handling system 300.

In the host environment, processor 302 is connected to I/O interface 310 via processor interface 306, and processor 304 is connected to the I/O interface via processor interface 308. Memory 320 is connected to processor 302 via a memory interface 322. Memory 325 is connected to processor 304 via a memory interface 327. Graphics interface 330 is connected to I/O interface 310 via a graphics interface 332, and provides a video display output 335 to a video display 334. In a particular embodiment, information handling system 300 includes separate memories that are dedicated to each of processors 302 and 304 via separate memory interfaces. An example of memories 320 and 325 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 340, disk controller 350, and I/O bridge 370 are connected to I/O interface 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 310 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 340 includes BIOS/UEFI code operable to detect resources within information handling system 300, to provide drivers for the resources, initialize the resources, and access the resources. BIOS/UEFI module 340 includes code that operates to detect resources within information handling system 300, to provide drivers for the resources, to initialize the resources, and to access the resources.

Disk controller 350 includes a disk interface 352 that connects the disk controller to HDD 354, to ODD 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits SSD 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O bridge 370 includes a peripheral interface 372 that connects the I/O bridge to add-on resource 374, to TPM 376, and to network interface 380. Peripheral interface 372 can be the same type of interface as I/O channel 312, or can be a different type of interface. As such, I/O bridge 370 extends the capacity of I/O channel 312 when peripheral interface 372 and the I/O channel are of the same type, and the I/O bridge translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on a separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as I/O interface 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Management device 390 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 300. In particular, management device 390 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 300, such as system cooling fans and power supplies. Management device 390 can include a network connection to an external management system, and the management device can communicate with the management system to report status information for information handling system 300, to receive BIOS/UEFI or system firmware updates, or to perform other task for managing and controlling the operation of information handling system 300. Management device 390 can operate off of a separate power plane from the components of the host environment so that the management device receives power to manage information handling system 300 when the information handling system is otherwise shut down. An example of management device 390 includes a commercially available BMC product or other device that operates in accordance with an Intelligent Platform Management Initiative (IPMI) specification, a Web Services Management (WS-Man) interface, a Redfish Application Programming Interface (API), another Distributed Management Task Force (DMTF), or other management standard, and can include an Integrated Dell Remote Access Controller (iDRAC), an Embedded Controller (EC), or the like. Management device 390 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A touch panel device, comprising:
    a face plate configured to receive at a first surface a contact with the face plate;
    a bracket having a first surface and a second surface, the second surface of the bracket facing a second surface of the face plate and including a first permanent magnet affixed to the second surface of the bracket;
    a printed circuit board (PCB) positioned proximate to the bracket such that a first surface of the PCB is adjacent to the second surface of the bracket, wherein the PCB includes a first Hall sensor on the first surface of the PCB and collocated proximate to the first permanent magnet; and
    a touch panel circuit coupled to the first Hall sensor, wherein when a first contact is received at the first surface of the face plate, the PCB moves closer to the bracket, and in response the touch panel circuit receives a first voltage from the first Hall sensor, determines a first force associated with the first contact based upon the first voltage, and triggers a first haptic feedback response in the bracket.

2. The touch panel device of claim 1, wherein when no contact is received at the first surface of the face plate, the touch panel circuit receives a second voltage form the first Hall sensor, and determines that no force is exerted on the first surface of the face plate based upon the second voltage.

3. The touch panel device of claim 2, wherein in response to receiving the first voltage from the first Hall sensor, the touch panel circuit is further configured to determine that the first force is greater than a threshold force.

4. The touch panel device of claim 3, wherein triggering the first haptic feedback response in the bracket is in response to determining that the first force is greater than the threshold force.

5. The touch panel device of claim 1, wherein the bracket further includes a second permanent magnet affixed to the second surface of the bracket.

6. The touch panel device of claim 5, wherein the PCB further includes a second Hall sensor on the first surface of the PCB and collocated proximate to the second permanent magnet.

7. The touch panel device of claim 6, wherein when the PCB moves closer to the bracket, the touch panel circuit receives a second voltage from the second Hall sensor and determines a second force associated with the first contact based upon the second voltage.

8. The touch panel device of claim 7, wherein the oscillating signal is proportional to the first force.

9. The touch panel device of claim 1, wherein the PCB further includes a coil coupled to the touch panel circuit.

10. The touch panel device of claim 9, wherein in triggering the first haptic response in the bracket, the touch panel circuit provides an oscillating signal to the coil.

11. A method, comprising:
    receiving, at a first surface of a face plate of a touch panel, a contact with the face plate;
    providing a bracket having a first surface and a second surface, the second surface of the bracket facing a second surface of the face plate;
    providing on the second surface of the bracket a first permanent magnet;
    positioning a printed circuit board (PCB) adjacent to the bracket such that a first surface of the PCB is adjacent to the second surface of the bracket;
    providing, on the first surface of the PCB, a first Hall sensor collocated proximate to the first permanent magnet;
    receiving, at the first surface of the face plate, a first contact, wherein when the first contact is received, the PCB moves closer to the bracket;
    in response to receiving the first contact, receiving by a touch panel circuit a first voltage from the first Hall sensor;
    determining a first force associated with the first contact based upon the first voltage; and
    triggering a first haptic feedback response in the bracket.

12. The method of claim 11, wherein when no contact is received at the first surface of the face plate, the method further comprises:
    receiving, by the touch panel circuit, a second voltage from the first Hall sensor; and
    determining that no force is exerted on the first surface of the face plate based upon the second voltage.

13. The method of claim 12, wherein in response to receiving the first voltage from the first Hall sensor, the method further comprises determining that the first force is greater than a threshold force.

14. The method of claim 13, wherein triggering the first haptic feedback response in the bracket is in response to determining that the first force is greater than the threshold force.

15. The method of claim 11, further comprising providing on the second surface of the bracket a second permanent magnet.

16. The method of claim 15, further comprising providing, on the first surface of the PCB, a second Hall sensor collocated proximate to the second permanent magnet.

17. The method of claim 16, wherein when the PCB moves closer to the bracket, the method further comprises:
    receiving, by the touch panel circuit, a second voltage from the second Hall sensor; and
    determining a second force associated with the first contact based upon the second voltage.

18. The method of claim 11, further comprising providing on the PCB a coil coupled to the touch panel circuit.

19. The method of claim 18, wherein in triggering the first haptic response in the bracket, the method further comprises providing, by the touch panel circuit, an oscillating signal to the coil.

20. An information handling system, comprising:
    a processor; and a touch panel including:

a face plate configured to receive at a first surface a contact with the face plate;

a bracket having a first surface and a second surface, the second surface of the bracket facing a second surface of the face plate and including a permanent magnet affixed to the second surface of the bracket;

a printed circuit board (PCB) positioned proximate the bracket such that a first surface of the PCB is adjacent to the second surface of the bracket, wherein the PCB includes a Hall sensor on the first surface of the PCB and collocated proximate to the permanent magnet; and a touch panel circuit coupled to the Hall sensor, wherein when the contact is received at the first surface of the face plate, the PCB moves closer to the bracket and in response, the touch panel circuit receives a voltage from the Hall sensor, determines a force associated with the contact based upon the voltage, triggers a haptic feedback response in the bracket, and provides an indication of the force to the processor.

* * * * *